US011942856B2

(12) United States Patent
Shen et al.

(10) Patent No.: US 11,942,856 B2
(45) Date of Patent: Mar. 26, 2024

(54) POWER CONVERSION APPARATUS, CONTROL MODULE, AND METHOD OF OPERATING THE SAME FOR MULTI-LEVEL OUTPUT VOLTAGE

(71) Applicant: ARK MICROELECTRONIC CORP. LTD., Shenzhen (CN)

(72) Inventors: Yi-Lun Shen, Central (HK); Yu-Yun Huang, Central (HK)

(73) Assignee: ARK MICROELECTRONIC CORP. LTD., Shenzhen (CN)

( * ) Notice: Subject to any disclaimer, the term of this patent is extended or adjusted under 35 U.S.C. 154(b) by 298 days.

(21) Appl. No.: 17/371,610

(22) Filed: Jul. 9, 2021

(65) Prior Publication Data

US 2022/0038016 A1 Feb. 3, 2022

(30) Foreign Application Priority Data

Jul. 31, 2020 (TW) .................................. 109125956

(51) Int. Cl.
*H02M 3/335* (2006.01)
*H02M 1/00* (2006.01)

(52) U.S. Cl.
CPC ....... *H02M 1/0058* (2021.05); *H02M 1/0012* (2021.05); *H02M 3/33507* (2013.01)

(58) Field of Classification Search
CPC ............ H02M 1/0058; H02M 1/0012; H02M 1/0006; H02M 1/0064; H02M 3/33507; H02M 3/33523
See application file for complete search history.

(56) References Cited

U.S. PATENT DOCUMENTS

2014/0029316 A1\* 1/2014 Adragna ........... H02M 3/33507
363/21.18
2015/0236598 A1\* 8/2015 Krueger ............ H02M 3/33507
363/21.17
(Continued)

FOREIGN PATENT DOCUMENTS

TW 201728067 A 8/2017

OTHER PUBLICATIONS

Office Action issued in corresponding Taiwan patent application No. 109125956 dated Jan. 8, 2021 (9 pages).

*Primary Examiner* — Kyle J Moody
*Assistant Examiner* — Jye-June Lee
(74) *Attorney, Agent, or Firm* — Muncy, Geissler, Olds & Lowe, P.C.

(57) ABSTRACT

A power conversion apparatus supplies power to a load, and the power conversion apparatus includes a power switch, a transformer, and a control module. The control module alternately turns on and turns off a power switch of the power conversion apparatus to convert an input voltage into an output voltage through the transformer. When the power switch is turned off, a primary side of the transformer generates a resonance voltage. The control module sets a predetermined counting threshold according to the output voltage, and sets a blanking time interval according to a feedback signal related to the load. After the blanking time interval ends, the control module counts a number of an oscillation turning point generated by the resonance voltage due to the oscillation of the resonance voltage. When the number reaches the predetermined counting threshold, the control module turns on the power switch.

16 Claims, 6 Drawing Sheets

(56) References Cited

U.S. PATENT DOCUMENTS

2017/0214325 A1* 7/2017 Chang ............... H02M 3/33507
2018/0337607 A1* 11/2018 Drda ................. H02M 3/33507
2020/0106368 A1* 4/2020 Chen ................. H02M 3/33507
2021/0091672 A1* 3/2021 Lin ................... H02M 3/33507

* cited by examiner

POWER CONVERSION APPARATUS, CONTROL MODULE, AND METHOD OF OPERATING THE SAME FOR MULTI-LEVEL OUTPUT VOLTAGE

BACKGROUND

Technical Field

The present disclosure relates to a power conversion apparatus, a control module, and a method of operating the same, and more particularly to a power conversion apparatus, a control module, and a method of operating the same for a multi-level output voltage.

Description of Related Art

The statements in this section merely provide background information related to the present disclosure and do not necessarily constitute prior art.

In the current power supply system, the power delivery (PD) function is the current mainstream power supply technology. The power transmission function is mainly to increase power transmission through cables and connectors, and expand the power supply capacity of the cable bus in power supply applications. The specification of the power transmission function can implement that the power supply system provides higher output voltage and output current, the transmission power can reach up to 100 watts, and the power transmission direction can be freely changed. At present, the power transmission function standard is divided into 10-watt, 18-watt, 36-watt, 60-watt, and 100-watt output power. The output voltage can provide multiple sets of different voltage levels (5 volts, 12 volts, 20 volts, etc.), and the output current may be 1.5 amps, 2 amps, 3 amps, and 5 amps. After the power supply system communicates with the load through the handshaking mechanism, it can provide the voltage level required for the operation of the load. Such a flexible configuration allows various electronic devices to meet power supply requirements through a single cable, not only for mobile devices, but also for notebook computers and displays.

SUMMARY

In order to solve the above-mentioned problems, the present disclosure provides a power conversion apparatus. The power conversion apparatus supplies power to a load. The power conversion apparatus includes a power switch, a transformer, and a control module. The transformer has a primary side coupled to the power switch, and a resonance voltage generated on the primary side when the power switch is turned off. The control module is coupled to the power switch, and alternately turns on and turns off the power switch to convert an input voltage into an output voltage through the transformer, sets a predetermined counting threshold according to the output voltage, and sets a blanking time interval according to a feedback signal related to the load. After the blanking time interval ends, the control module counts a number of oscillation turning points presented during an oscillation of the resonance voltage, and turns on the power switch when the number reaches the predetermined counting threshold.

In order to solve the above-mentioned problems, the present disclosure provides a control module. The control module alternately turns on and turns off a power switch of a power conversion apparatus to provide an output voltage. The control module includes a timing unit, a detection unit, and a control unit. The timing unit sets a blanking time interval according to a feedback signal of the power conversion apparatus, wherein the feedback signal is related to a load. The detection unit detects the output voltage and a resonance voltage at a primary side of the power conversion apparatus. The control unit is coupled to the detection unit, and sets a predetermined counting threshold according to the output voltage, and counts a number of oscillation turning points presented during an oscillation of the resonance voltage after the blanking time interval ends, and turns on the power switch when the number reaches the predetermined counting threshold.

The main purpose and effect of the present disclosure are: setting a blanking time interval according to a loading of the output voltage when the control module controls the power switch of the power conversion apparatus to turn on after it is turned off, and acquiring different and specific turned-on timings based on the output voltage with different voltage levels after the blanking time interval ends to appropriately control the turned-on time and switching frequency of the power switch of the power conversion apparatus with power delivery (PD) function, thereby quickly stabilizing the output voltage thereof.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
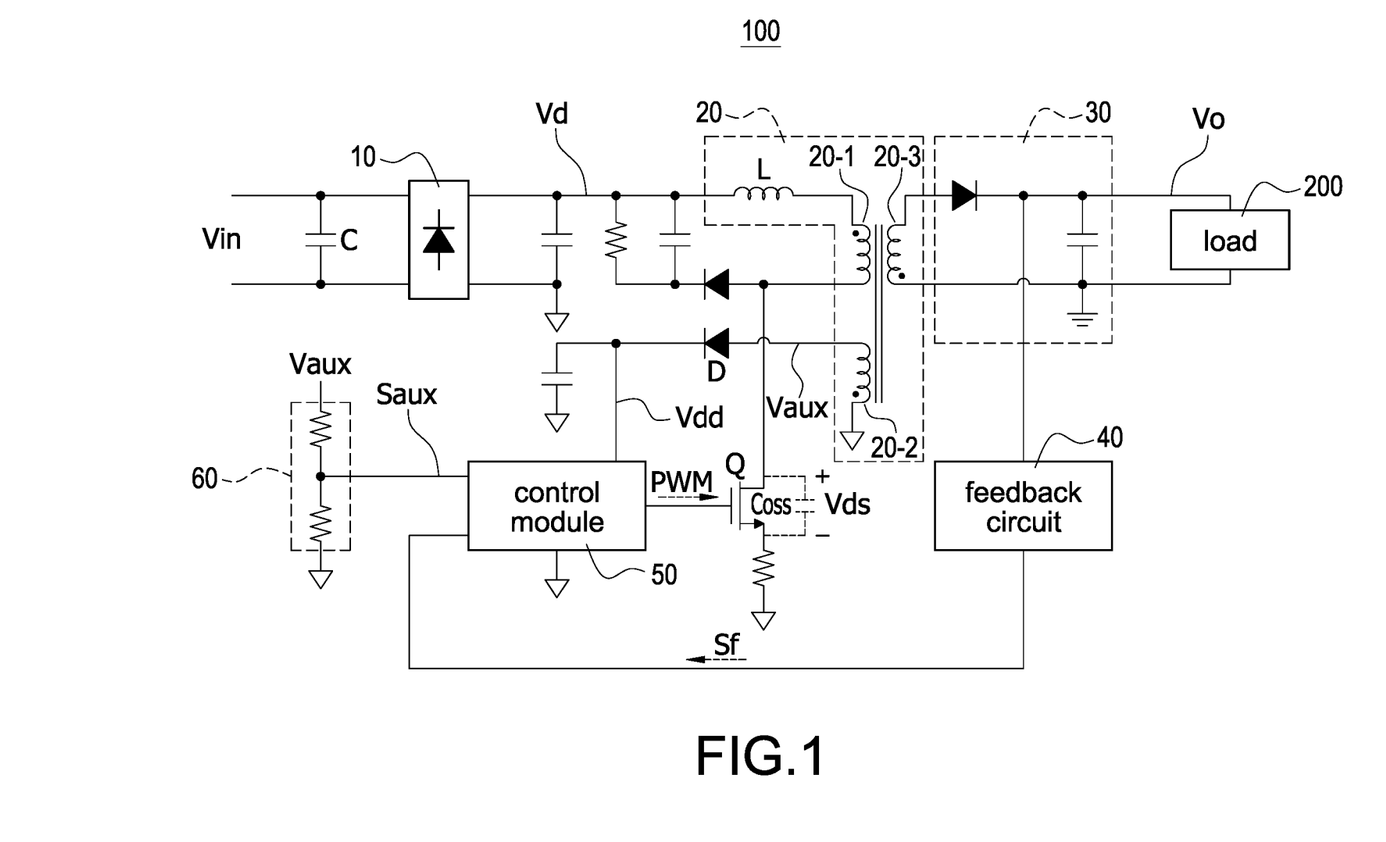
FIG. 1 is a block circuit diagram of a power conversion apparatus according to the present disclosure.

Please refer to FIG. 1, which shows a block circuit diagram of a power conversion apparatus according to the present disclosure. The power conversion apparatus 100 receives an input voltage Vin, and converts the input voltage Vin into an output voltage Vo to supply power to a load 200. In this embodiment, the power conversion apparatus 100 is a flyback converter. The power conversion apparatus 100 includes a bridge rectifier circuit 10, a transformer 20, a power switch Q, a rectifier circuit 30, a feedback circuit 40, and a control module 50. The transformer 20 isolates the power conversion apparatus 100 into a primary side and a secondary side. The primary side of the transformer 20 includes a primary-side winding 20-1 and an auxiliary winding 20-2. The primary-side winding 20-1 of the transformer 20 is coupled to the bridge rectifier circuit 10 and the power switch Q. The secondary side of the transformer 20 includes a secondary-side winding 20-3. The rectifier circuit 30 is coupled to the secondary-side winding 20-3, the feedback circuit 40, and the load 200.

The bridge rectifier circuit 10 converts the input voltage Vin into a DC voltage Vd, and provides the DC voltage Vd to the primary-side winding 20-1. The power conversion apparatus 100 is a conversion apparatus having a power delivery (PD) function. The control module 50 may operate the power conversion apparatus 100 in a discontinuous conduction mode (DCM). The control module 50 is coupled to the power switch Q, the auxiliary winding 20-2, and the feedback circuit 40. The control module 50 provides a PWM (pulse width modulation) signal PWM to alternately turn on and turn off the power switch Q so as to convert the DC voltage Vd into the output voltage Vo through the transformer 20. The feedback circuit 40 makes the control module 50 control the power conversion apparatus 100 to provide the output voltage Vo with different voltage levels, such as but not limited to, 3 volts, 5 volts, 12 volts, and so on. In one embodiment, the feedback circuit 40 has an error amplifier. The error amplifier is used to compare the output voltage Vo with a voltage level required by the load 200, such as a reference voltage Vref to control a photo coupler to generate a feedback signal Sf to the primary side.

Figure 2:
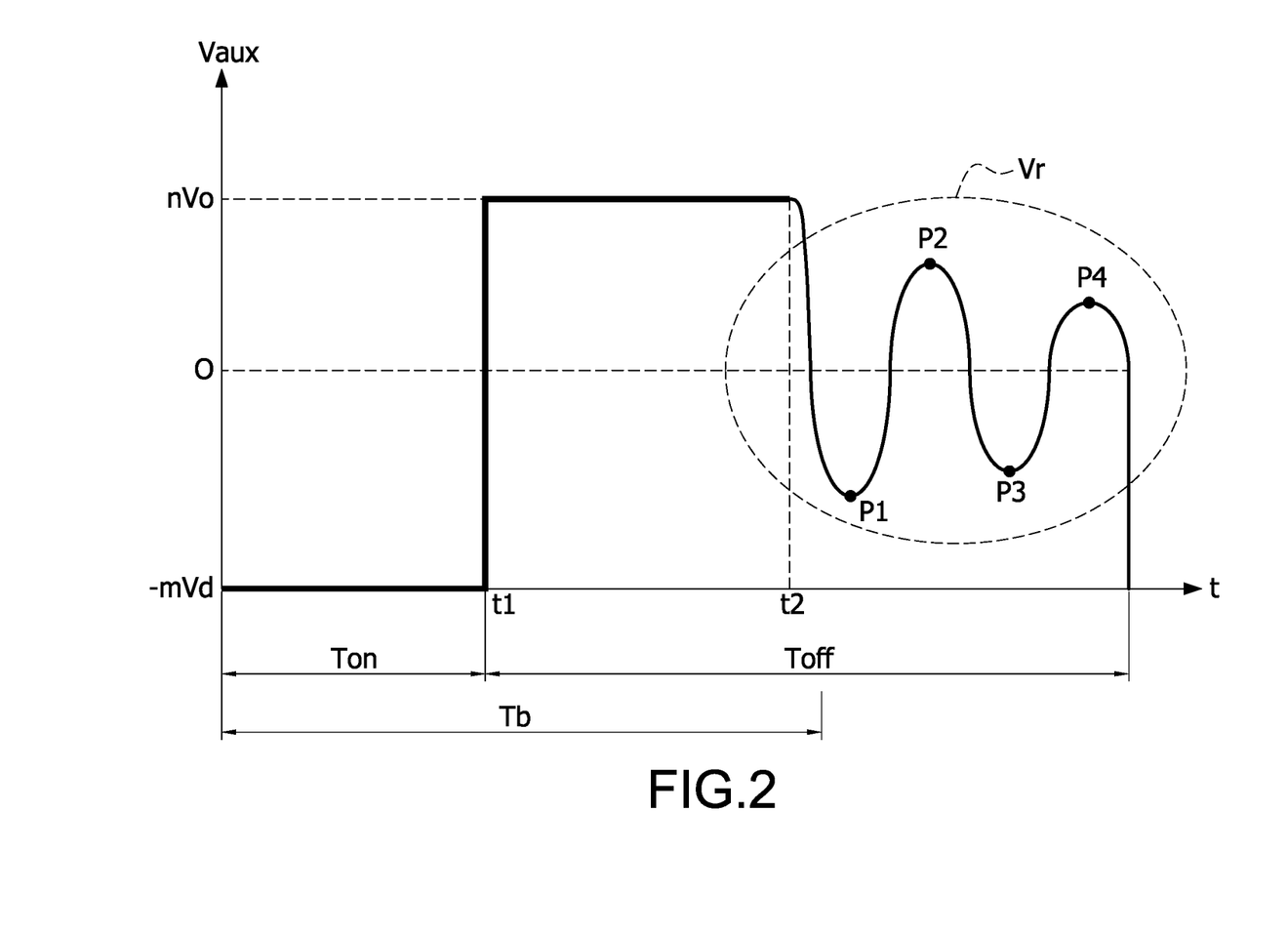
FIG. 2 is a schematic waveform diagram of a voltage across two ends of a power switch according to the present disclosure.

Please refer to FIG. 2, which shows a schematic waveform diagram of a voltage across two ends of a power switch according to the present disclosure, and also refer to FIG. 1. When the control module 50 turns on the power switch Q (i.e., during a time period Ton), the transformer 20 stores energy, and a voltage Vds across two ends (i.e., a drain and a source) of the power switch Q is approximately zero volt. At this condition, since the auxiliary winding 20-2 is coupled to the primary-side winding 20-1 and opposite polarity, the voltage value of the induced auxiliary voltage Vaux is negative m times of the DC voltage Vd, wherein m represents a turns ratio between the primary-side winding 20-1 and the auxiliary winding 20-2. At time t1, the control module 50 turns off the power switch Q and the transformer 20 starts to release energy. In the process of releasing energy, the auxiliary voltage Vaux is approximately n times of the output voltage Vo (n is a turn ratio between the secondary-side winding 20-3 and the auxiliary winding 20-2), as shown in FIG. 2.

At time t2, the control module 50 turns off the power switch Q. The energy stored in the transformer 20 has been completely released, and the secondary-side current has been completely zero to be an open-circuit state. At this condition, the voltage Vds across two ends of the power switch Q occurs resonance due to the present of an RLC resonant tank composed of a wire resistance, a magnetizing inductance L of the primary-side winding 20-1, and a parasitic capacitance Coss. Since the inductance of the auxiliary winding 20-2 induces a voltage across the primary-side winding 20-1, the auxiliary voltage Vaux also starts to resonate based (centered) on the zero volt, as shown in the waveform after time t2 in FIG. 2. The auxiliary voltage Vaux oscillates back and forth to generate a plurality of (for example, but not limited to, four) oscillation turning points P1-P4.

Figure 3:
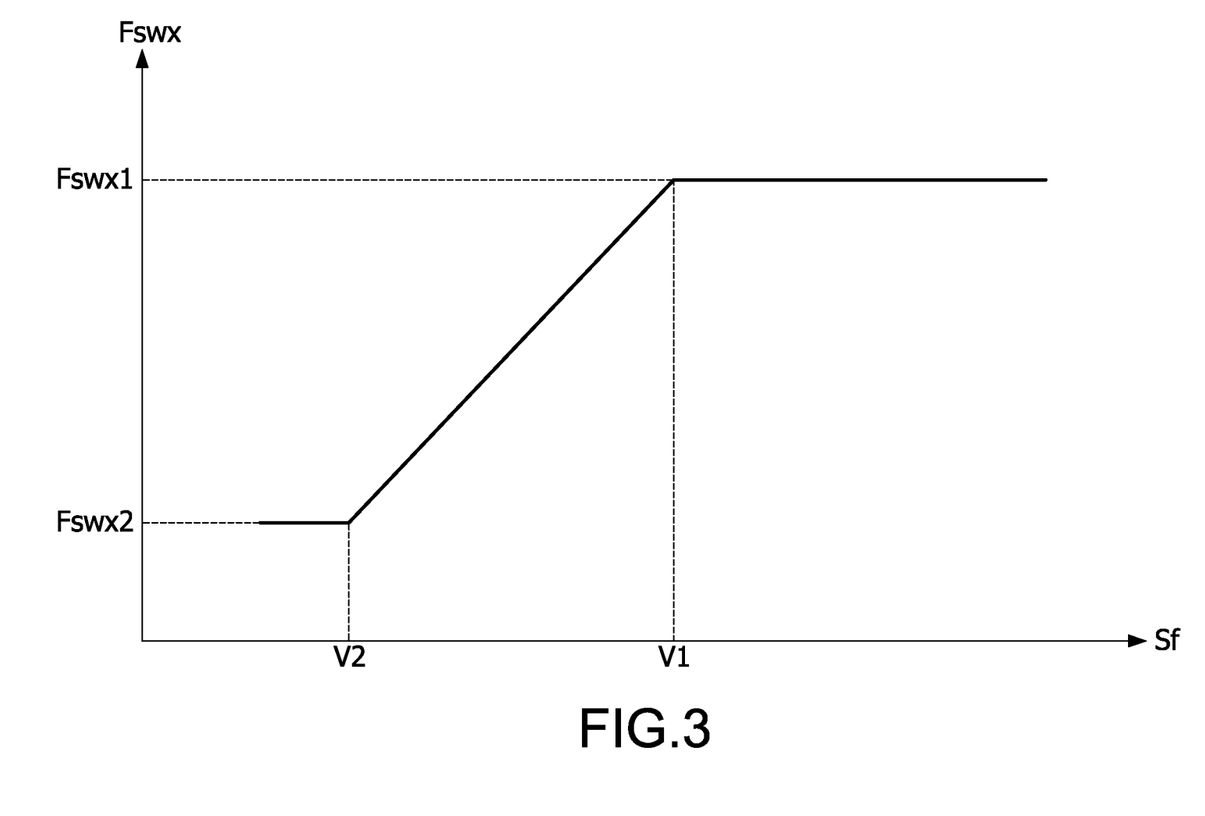
FIG. 3 is a frequency reduction curve applied to the power conversion apparatus according to the present disclosure.

Please refer FIG. 3, which shows a frequency reduction curve applied to the power conversion apparatus according to the present disclosure, and also refer to FIG. 1 to FIG. 2. In the power conversion apparatus 100, the control module 50 controls the maximum switching frequency Fswx of the power switch Q, which is mainly related to the loading of the load 200, and the detailed description will be made hereinafter. The actual switching frequency of the power switch Q is approximately close to the maximum switching frequency Fswx, but not greater than the maximum switching frequency Fswx. When the load 200 is heavier (for example, a heavy loading), the higher the voltage value of the feedback signal Sf, and the higher the maximum switching frequency Fswx of the power switch Q; on the contrary, the lower the voltage value of the feedback signal Sf and the lower the maximum switching frequency Fswx.

Therefore, a frequency reduction curve of FIG. 3 may be established through the above-mentioned relationship, and the frequency reduction curve enables the power conversion apparatus 100 to acquire stable output power udder different loads 200. When the load 200 is heavier (for example, a heavy loading) to make the voltage of the feedback signal Sf higher than a first level V1, the control module 50 controls the maximum switching frequency Fswx of the power switch Q to be a first switching frequency Fswx1. When the load 200 is lighter (for example, a light loading) to make the voltage of the feedback signal Sf lower than a second level V2, the control module 50 controls the maximum switching frequency Fswx of the power switch Q to be a second switching frequency Fswx2. In particular, the first switching frequency Fswx1 is higher than the second switching frequency Fswx2. When the load 200 between the two loadings, the voltage of the feedback signal Sf and the maximum switching frequency Fswx have a substantially linear relationship.

The frequency reduction curve of FIG. 3 may also be regarded as a relationship curve between the feedback signal Sf and a blanking time interval Tb, and an exemplified embodiment is shown in FIG. 2. In particular, the blanking time interval Tb is equal to a reciprocal of the maximum switching frequency Fswx, i.e., Tb=1/Fswx. At the beginning of a switching cycle, the control module 50 determines the blanking time interval Tb according to the feedback signal Sf, and after the blanking time interval Tb has passed, the control module 50 allows the next switching cycle to start. Therefore, the switching frequency will not be greater than the maximum switching frequency Fswx.

Please refer to FIG. 1 to FIG. 3 again, specifically, the control module 50 receives the feedback signal Sf provided by the feedback circuit 40 to set the blanking time interval Tb. The feedback signal Sf may represent the condition (state) of the load 200 (for example, light load or heavy load). The heavier the load 200, the higher the feedback signal Sf, and the shorter the blanking time interval Tb.

A voltage divider circuit 60 receives the auxiliary voltage Vaux, and divides the auxiliary voltage Vaux into the auxiliary signal Saux. The control module 50 receives the auxiliary signal Saux and sets a predetermined counting threshold according to the auxiliary signal Saux. The control module 50 realizes the output voltage Vo according to the auxiliary voltage Vaux. Since the auxiliary voltage Vaux incudes n times of the output voltage Vo when the power switch Q is turned off, the control module 50 can realize (the level of) the output voltage Vo by the received auxiliary signal Saux.

As shown in FIG. 2, the blanking time interval Tb is mainly provided to prevent the control module 50 to turn on the power switch Q again within a period of time after the power switch Q is turned on (or turned off in another embodiment). Therefore, the blanking time interval Tb may blank not only the time interval t1-t2, but also part of a resonance voltage Vr, and the range of blanking depends on the feedback signal Sf. Afterward, after the control module 50 realizes the end of the blanking time interval Tb, the control module 50 starts to count or increase the number of oscillation turning points that occur next. In particular, the oscillation turning points are presented during an oscillation of the resonance voltage Vr, and after the blanking time interval Tb ends, the control module 50 starts to count or increase the number of the oscillation turning points. When the number of oscillation turning points counted by the control module 50 reaches the predetermined counting threshold set by the control module 50, the control module 50 turns on the power switch Q. By using the blanking time interval Tb with the counting of the oscillation turning point, a single set of frequency reduction curve (but not limited) is used to adjust the maximum switching frequency Fswx to stabilize (regulate) the output voltage Vo of the power conversion apparatus 100 under different levels of the output voltage Vo. Therefore, the blanking time interval Tb set by the control module 50 may be generated based on a single frequency reduction curve, and this single frequency reduction curve provides a predetermined relationship between the feedback signal Sf and the blanking time interval Tb.

Figure 4:
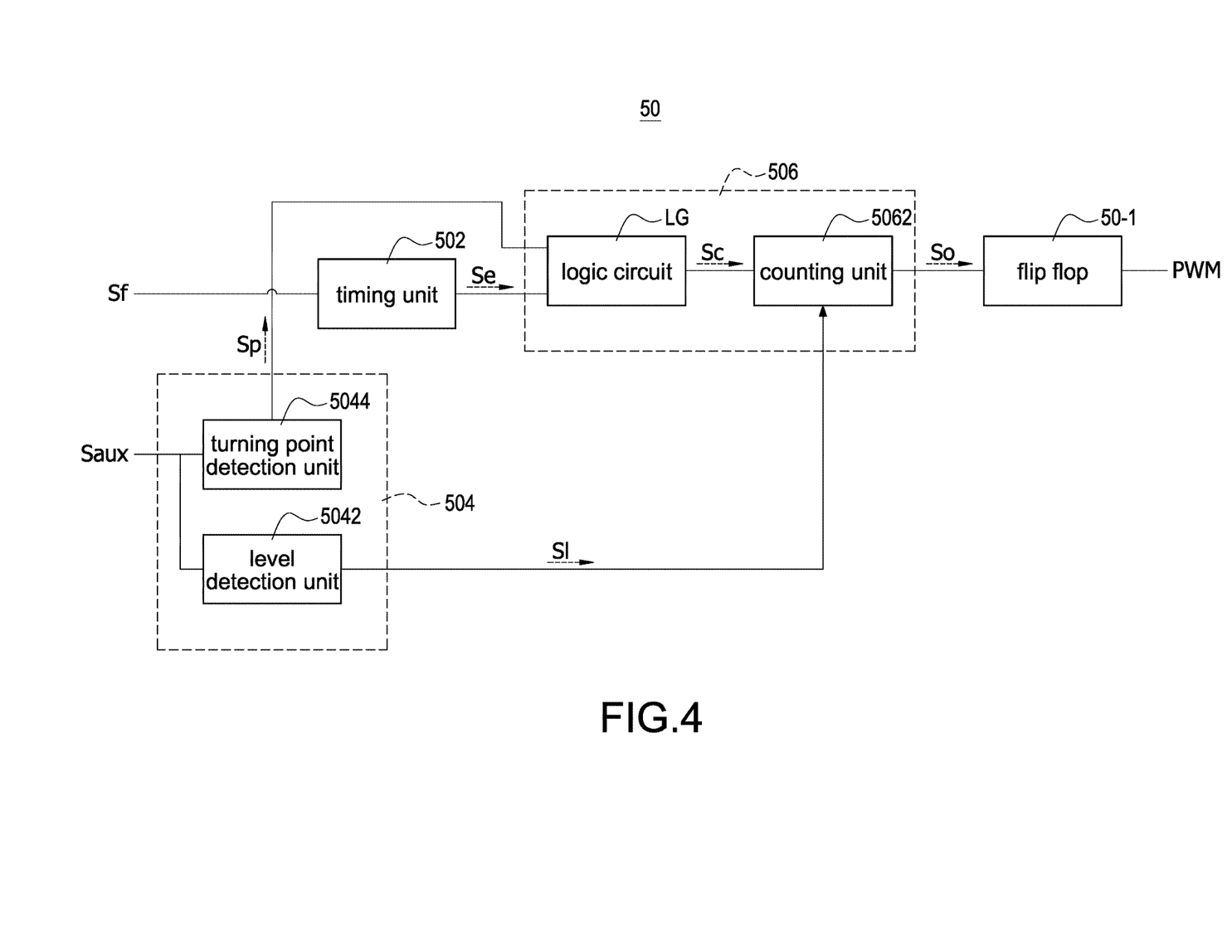
FIG. 4 is a block circuit diagram of a control module according to the present disclosure.

Please refer to FIG. 4, which shows a block circuit diagram of a control module according to the present disclosure, and also refer to FIG. 1 to FIG. 3. The control module 50 includes a timing unit 502, a detection unit 504, and a control unit 506. The timing unit 502 sets a blanking time interval Tb according to a feedback signal Sf, which is related to the load 200, provided by the feedback circuit 40. In one embodiment, since the control module 50 operates under a single frequency reduction curve, the timing unit 502 realizes the light or heavy condition of the load 200 according to the feedback signal Sf to set the time length of the blanking time interval Tb. Afterward, Then, after the blanking time interval Tb arrives, the control unit 506 starts to count or increase the number of the oscillation turning points through an enabled signal Se.

The detection unit 504 is coupled to the voltage divider circuit 60 to receive the auxiliary Saux. The detection unit 504 includes a level detection unit 5042 and a turning point detection unit 5044. The level detection unit 5042 compares the auxiliary signal Saux with a predetermined level to provide a level signal Sl to the control unit 506. For example, in the process of releasing energy of the transformer 20, if the auxiliary signal Saux is greater than 2.5 volts, the level signal Sl is logically "1", which indicates that the current output voltage Vo should be regulated at least 12 volts. If the auxiliary signal Saux is less than 2.5 volts, the level signal Sl is logically "0", which indicates that the current output voltage Vo should be regulated at least 5 volts.

The turning point detection unit 5044 receives the auxiliary signal Saux, and compares the auxiliary signal Saux with a threshold to provide a pulse Sp to the control unit 506. Specifically, the turning point detection unit 5044 compares the auxiliary signal Saux with a zero-volt threshold. When the auxiliary signal Saux crosses over the zero-volt threshold and after a predetermined delay time, the turning point detection unit 5044 provides the pulse Sp to the control unit 506, that is, approximately the time when an oscillation turning point appears. In particular, there are three opportunities for generating the pulse Sp. The first one is: the pulse Sp is generated at both a valley turning point and a peak turning point. The second one is: the pulse Sp is generated at a valley turning point. The third one is: the pulse Sp is generated at a peak turning point. Specifically, when the auxiliary signal Saux downwards crosses the zero-volt threshold, it can be regarded as the valley turning point is about to appear. Relatively, when the auxiliary signal Saux upwards crosses the zero-volt threshold, it can be regarded as the peak turning point is about to appear.

The control unit 506 is coupled to the timing unit 502 and the detection unit 504. The control unit 506 sets the predetermined counting threshold according to the level signal Sl, and realizes the end of the blanking time interval Tb, the control unit 506 starts to count or increase the number of the pulse Sp corresponding to the oscillation turning point of the resonance voltage Vr. Specifically, the control unit 506 includes a logic circuit LG and a counting unit 5062. The logic circuit LG is mainly used to provide the corresponding pulse Sp after the blanking time interval Tb, and provides a pulse Sc to the counting unit 5062. The pulse number of the pulse Sc represents the number of the oscillation turning points of the resonance voltage Vr after the blanking time interval Tb. In one embodiment, a simple implementation of the logic circuit LG may be a AND gate, a NAND, a comparison circuit, or a self-designed circuit. The counting unit 5062 receives the pulse Sc and the level signal Sl, and sets the predetermined counting threshold according to the level signal S1. The counting unit 5062 counts the pulse number of the pulse Sc, and triggers turning on the power switch Q through an activation signal So when the pulse number reaches the predetermined counting threshold. As shown in FIG. 4, since the control module 50 may include other logic determination circuits (such as but not limited to a protection circuit), the activation signal So and other logic determination signals may be modulated into a pulse-width modulation signal PWM through (for example but not limited to) a flip flop 50-1, and then the pulse-width modulation signal PWM is provided to the power switch Q.

Figure 5A:
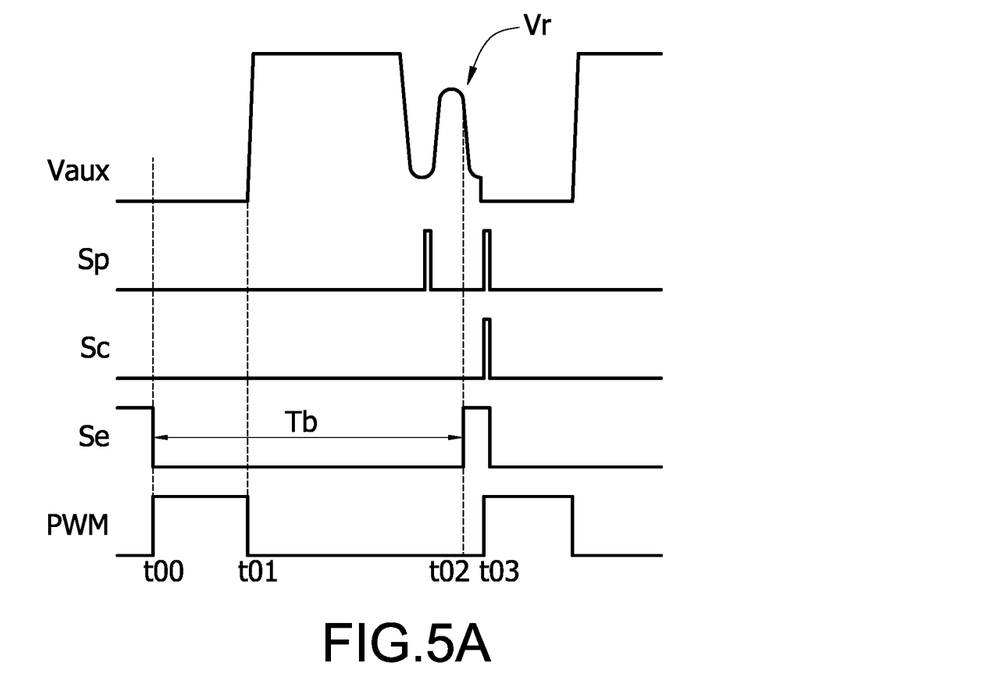
FIG. 5A is a schematic circuit waveform diagram when an output voltage is at a high level according to the present disclosure.
Figure 5B:
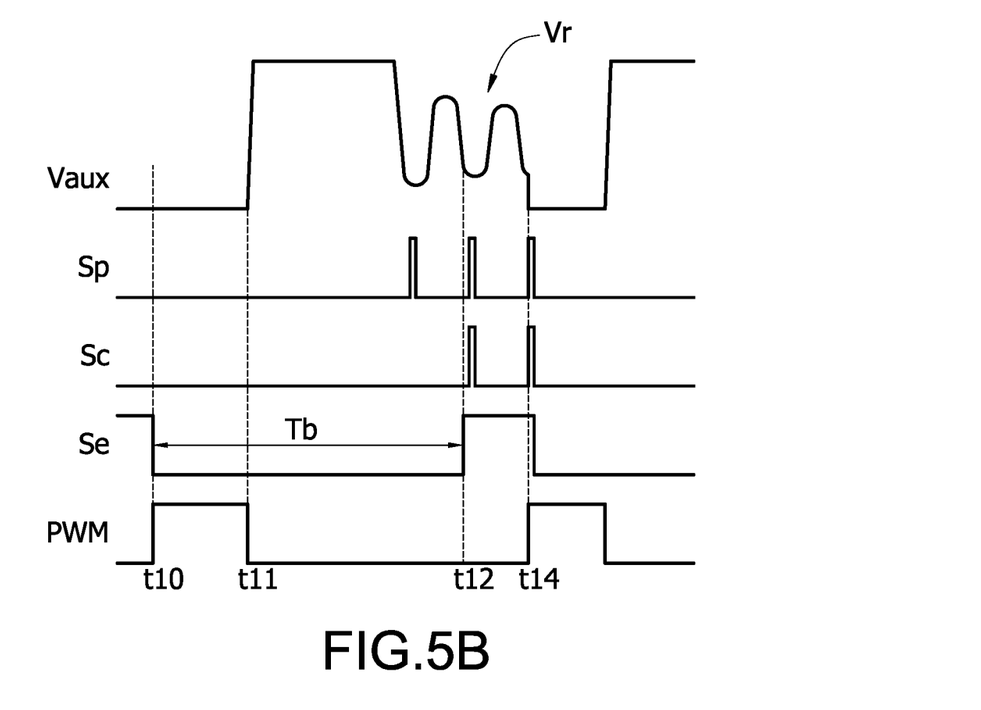
FIG. 5B is a schematic circuit waveform diagram when the output voltage is at a low level according to the present disclosure.

Please refer to FIG. 5A, which shows a schematic circuit waveform diagram when an output voltage is at a high level (such as 20 volts) according to the present disclosure, FIG. 5B, which shows a schematic circuit waveform diagram when the output voltage is at a low level (such as 5 volts) according to the present disclosure, and also refer to FIG. 1 to FIG. 4. FIG. 5A and FIG. 5B both use the valley turning point for counting of pulse Sp. During time t00 to time t01, the pulse-width modulation signal PWM turns on the power switch Q, and after time t01, the pulse-width modulation signal PWM turns off the power switch Q. In FIG. 5A, it is assumed that the control unit 506 sets the predetermined counting threshold to one according to the level signal with logic "1" (i.e., the output voltage Vo is high-level), that is, the power switch Q is triggered at the first valley after the blanking time interval tb. The control module 50 realizes that the voltage Vds generates the resonance voltage Vr through the auxiliary signal Saux when the energy stored in the magnetizing inductance has been completely released. Since the blanking time interval Tb ends at time t02, the control unit 506 starts to count or increase the pulse number of the pulse Sc after time t02. When the counted pulse number reaches the predetermined counting threshold, i.e., one at time t03, the control unit 506 triggers turning on the power switch Q.

In FIG. 5B, it is assumed that the control unit 506 sets the predetermined counting threshold to two according to the level signal with logic "0" (i.e., the output voltage Vo is low-level), that is, the power switch Q is triggered at the second valley after the blanking time interval Tb. According to the same control manner in FIG. 5A, the control unit 506 starts to count or increase the pulse number of the pulse Sc after time t12 (the blanking time interval Tb ends at time t12). When the counted pulse number reaches the predetermined counting threshold, such as two at time t14, the control unit 506 triggers turning on the power switch Q.

In some embodiments, the pulse Sc may represent the valley turning point and/or the peak turning point after the blanking time interval Tb ends. When the pulse number of the pulse Sc reaches the predetermined counting threshold, the control unit 506 triggers the power switch Q through the activation signal So that the power switch Q is turned on about the valley turning point appearing to implement the valley switching.

Moreover, using the resonance voltage Vr to trigger turning on the power switch Q at the valley turning point is called a quasi-resonant (QR) control mode, which is also called a valley switching. The advantage of the valley switching is that the low-voltage stress applied to two ends of the power switch Q while switching so as to eliminate or reduce the switching loss. However, the present disclosure is not limited to the QR control mode or the valley switching. In some embodiments, the control unit 506 may turn on the power switch Q about the peak turning point appearing. Although turning on the power switch Q when the resonance voltage at the peak turning point does not have the above-mentioned advantage, its operation may still be implemented and satisfies the purpose of the present disclosure.

Figure 6:
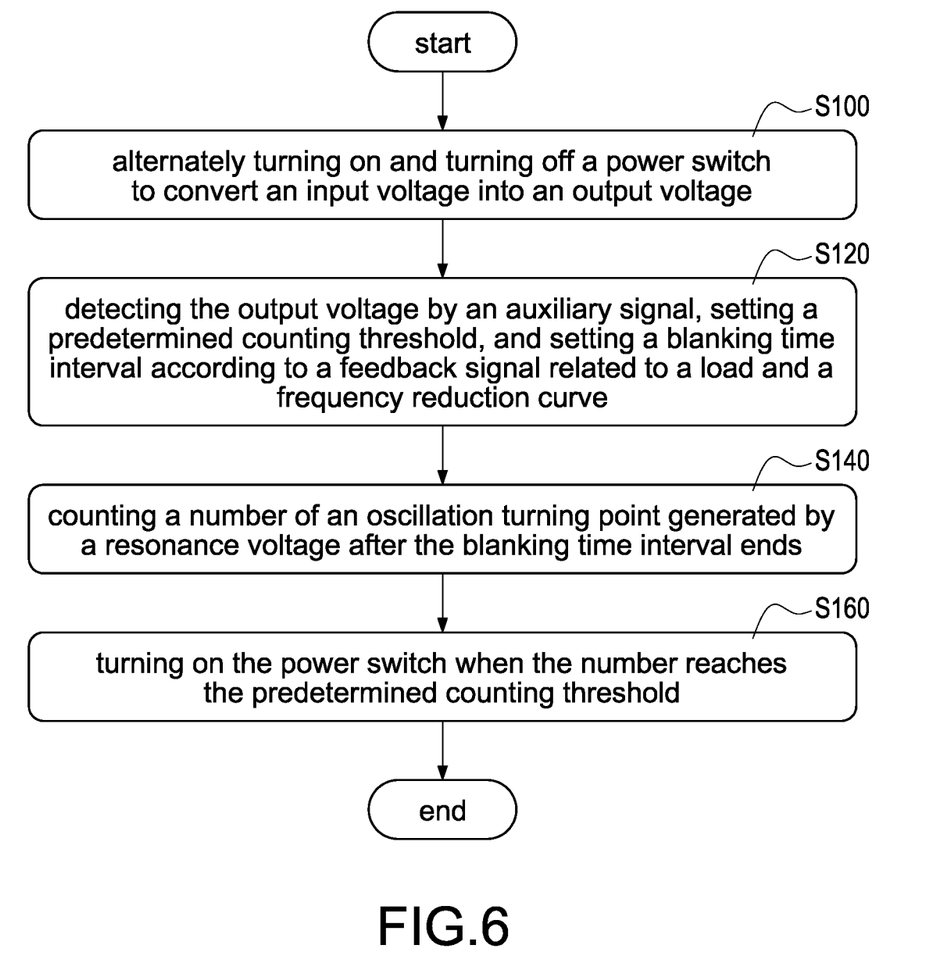
FIG. 6 is a flowchart of a method of operating the power conversion apparatus according to the present disclosure.

Please refer to FIG. 6, which shows a flowchart of a method of operating the power conversion apparatus according to the present disclosure, and also refer to FIG. 1 to FIG. 5B. The control unit 506 alternately turns on and turns off the power switch Q to convert the input voltage Vd into the output voltage Vo through the transformer 20 (S100).

Afterward, the control module 50 receives the auxiliary signal Saux to detect the output voltage Vo, sets the predetermined counting threshold, and sets the blanking time interval Tb according to a predetermined relationship between the feedback signal Sf related to the load 200 and the frequency reduction curve shown in FIG. 3 (S120).

After the blanking time interval Tb ends, the control module 50 starts to count or increase the pulse number of the pulse Sc so as to acquire the number of the oscillation turning points of the resonance voltage Vr (S140).

Finally, when the counted pulse number reaches the predetermined counting threshold, the control module 50 provides the pulse-width modulation signal PWM to turn on the power switch Q (S160).

By using the blanking time interval Tb with the counting of the oscillation turning point, the turned-on time and switching frequency of the power switch Q may be appropriately controlled to quickly stabilize (regulate) the output voltage Vo of the power conversion apparatus 100 under different levels of the output voltage Vo.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power conversion apparatus supplying power to a load, the power conversion apparatus comprising:
a power switch,
a transformer having a primary side coupled to the power switch, and a resonance voltage generated on the primary side when the power switch is turned off, and
a control module coupled to the power switch, and configured to alternately turn on and turn off the power switch to convert an input voltage into an output voltage through the transformer, and an auxiliary winding of the transformer configured to sense an auxiliary voltage and configured to provide a level signal corresponding to a voltage level of the output voltage according to the auxiliary voltage, so as to set a predetermined counting threshold according to the level signal, and set a blanking time interval according to a feedback signal related to the load;
wherein, after the blanking time interval ends, the control module counts a number of oscillation turning points presented during an oscillation of the resonance voltage, and turns on the power switch when the number reaches the predetermined counting threshold.

2. The power conversion apparatus as claimed in claim 1, wherein the control module comprises:
a timing unit configured to set the blanking time interval according to the feedback signal, wherein the feedback signal is generated by detecting the output voltage,
a detection unit coupled to the auxiliary winding, and configured to provide the level signal, and provide at least one pulse, each of the at least one pulse respectively corresponding to one of the oscillation turning points, and
a control unit configured to set the predetermined counting threshold according to the level signal, and increases the number according to each of the at least one pulse presented after the blanking time interval ends.

3. The power conversion apparatus as claimed in claim 2, wherein the detection unit comprises:
a level detection unit configured to compare the auxiliary voltage with a predetermined level to notify the control unit to set the predetermined counting threshold, and
a turning point detection unit configured to compare the auxiliary voltage with a threshold value to provide the at least one pulse.

4. The power conversion apparatus as claimed in claim 3, wherein the control unit comprises:
a counting unit coupled to the timing unit and the turning point detection unit, and configured to increase the number in response to each pulse presented after the blanking time interval ends, and trigger to turn on the power switch when the number reaches the predetermined counting threshold.

5. The power conversion apparatus as claimed in claim 2, wherein the oscillation turning point is a valley turning point; the detection unit provides the at least one pulse corresponding to the resonance voltage at the valley turning point to the control unit, and the control unit increases the number in response to each pulse presented after the blanking time interval.

6. The power conversion apparatus as claimed in claim 2, wherein the oscillation turning point is a peak turning point;

the detection unit provides the at least one pulse corresponding to the resonance voltage at the peak turning point to the control unit, and the control unit increases the number in response to each pulse presented after the blanking time interval.

7. The power conversion apparatus as claimed in claim 2, wherein a secondary side of the transformer comprises:
   a rectifier circuit configured to rectify a power at the secondary side into the output voltage, and
   a feedback circuit configured to provide the feedback signal to the control module according to the output voltage.

8. The power conversion apparatus as claimed in claim 2, wherein the blanking time interval is generated according to a frequency reduction curve, wherein the frequency reduction curve provides a predetermined relationship between the feedback signal and the blanking time interval.

9. The power conversion apparatus as claimed in claim 1, wherein the power conversion apparatus communicates with the load to determine the voltage level required for the operation of the load.

10. A method of operating a power conversion apparatus, the power conversion apparatus configured to supply power to a load, the method comprising steps of:
    alternately turning on and turning off a power switch of the power conversion apparatus to convert an input voltage into an output voltage through a transformer,
    sensing an auxiliary voltage through the transformer to provide a level signal corresponding to a voltage level of the output voltage according to the auxiliary voltage,
    setting a predetermined counting threshold according to the level signal, and setting a blanking time interval according to a feedback signal, wherein the feedback signal is related to the load,
    counting a number of oscillation turning points presented during an oscillation of a resonance voltage after the blanking time interval ends, and
    turning on the power switch when the number reaches the predetermined counting threshold.

11. The method as claimed in claim 10, further comprising steps of:
    comparing the output voltage with a reference voltage to generate the feedback signal,
    providing at least one pulse, each of the at least one pulse respectively corresponding to one of the oscillation turning points, and
    increasing the number of the oscillation turning points according to each of the at least one pulse presented after the blanking time interval ends.

12. The method as claimed in claim 11, further comprising steps of:
    comparing an auxiliary voltage of the transformer with a predetermined level to set the predetermined counting threshold, and
    comparing the auxiliary voltage with a threshold value to provide the at least one pulse.

13. The method as claimed in claim 11, wherein the oscillation turning point is a valley turning point or a peak turning point.

14. The method as claimed in claim 11, wherein the blanking time interval is generated according to a predetermined relationship between the feedback signal and a frequency reduction curve.

15. The method as claimed in claim 10, wherein the power conversion apparatus communicates with the load to determine the voltage level required for the operation of the load.

16. A control module configured to alternately turn on and turn off a power switch of a power conversion apparatus to provide an output voltage, the control module comprising:
    a timing unit configured to set a blanking time interval according to a feedback signal of the power conversion apparatus, wherein the feedback signal is related to a load,
    a detection unit configured to detect a resonance voltage at a primary side of the power conversion apparatus, and configured to detect an auxiliary voltage at the primary side to provide to provide a level signal corresponding to a voltage level of the output voltage according to the auxiliary voltage, and
    a control unit coupled to the detection unit, and configured to set a predetermined counting threshold according to the level signal, and count a number of oscillation turning points presented during an oscillation of the resonance voltage after the blanking time interval ends, and turn on the power switch when the number reaches the predetermined counting threshold.

* * * * *